INVENTOR
ADAM L. KELLER
BY
Smythe & Moore
ATTORNEYS 3,538,354
ELECTRIC FLASHER CIRCUIT
Adam L. Keller, Michigan City, Ind., assignor, by mesne assignments, to Meridian Industries, Inc., Southfield, Mich., a corporation of Delaware
Filed May 2, 1967, Ser. No. 635,614
Int. Cl. H03k 17/26
U.S. Cl. 307—293            12 Claims

ABSTRACT OF THE DISCLOSURE

A flasher system for use in lamp flashing circuits, the system using a transistor and reed switch in conjunction with a timing circuit for controlling the flashing operation.

---

Figure 1:
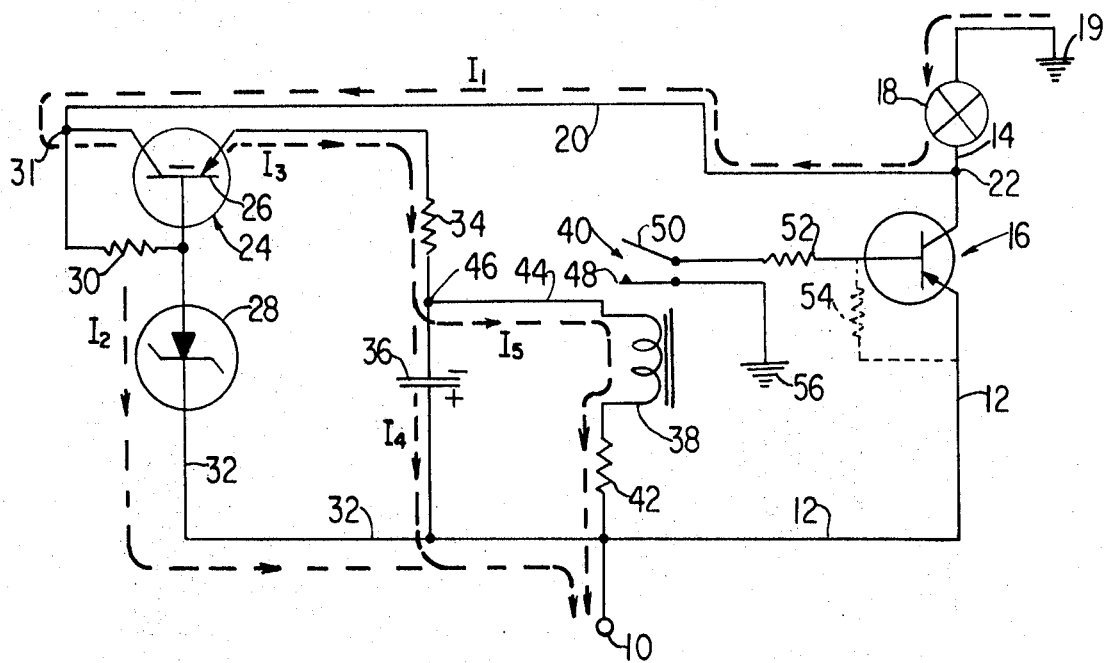

This invention relates to transistorized electric flasher circuits and more particularly to a flasher circuit adapted to operate on relatively low voltage D.C. such as supplied by a battery or the like. Such flashers have particular utility in automotive equipment, but are also useful for other purposes.

It has been found desirable to provide a relatively low-cost flasher circuit or system where a shorter life expectancy can be used but which still meets the practical requirements of its intended use.

It is an object of the present invention to provide a transistorized or solid-state flasher circuit which is low in cost but has a life expectancy sufficient for its practical requirements and is almost completely noiseless in operation.

A further object of the invention is to provide a simplified flasher circuit in which the rate of flash is not dependent upon the supply voltage.

A futher object of the invention is to provide a simplified flasher circuit in which the rate of flash is substantially completely independent of the load.

Still another object of the invention is to provide a flasher circuit in which the timing circuit does not operate until the lamp or other load is connected.

In one aspect of the invention, the circuit comprises a lamp or other load, a switching transistor or solid-state switching element, a reed-type switch for operating the switching element, a timing capacitor, and a Zener controlled series pass transistor for regulating the voltage and current to the timing capacitor and reed switch. As the charging voltage of the timing capacitor increases through the Zener controlled regulator, a larger voltage is applied to the relay element of the reed switch, thereby causing operation of the reed switch and an application of an operating voltage to the load switching transistor to turn on the load. Upon conduction of the load switching element, the Zener diode and series pass transistor are rendered incapable of regulation and the timing capacitor begins to discharge through the relay element of the reed switch to maintain the reed switch operative for a predetermined period of time, depending upon the time constants of the circuit. Thereafter, the circuit repeats itself.

The foregoing and other objects, features and advantages of the invention will become apparent from the following description taken in conjunction with the accompanying drawings which illustrates an exemplary embodiment of the invention.

Figure 2:
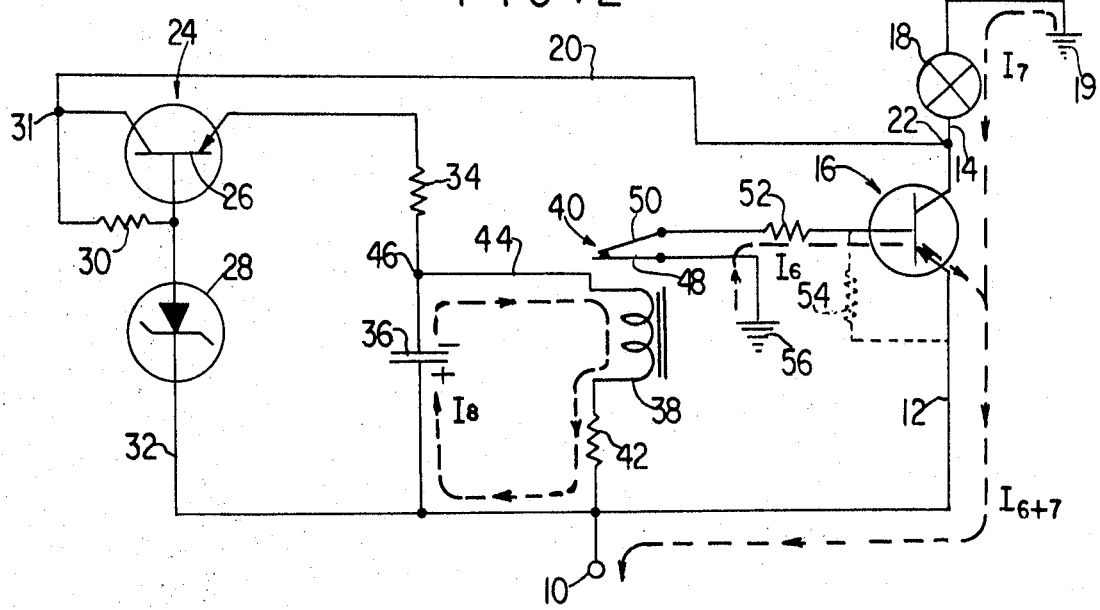

In the drawings:

FIG. 1 is a circuit diagram of one form of the invention with arrows indicating the flow of electricity in the "load-off" condition; and FIG. 2 is a similar view showing the electric flow by arrows during the "load-on" condition.

Referring to the drawings, there is shown a relatively low voltage battery D.C. source 10 connected by leads 12 and 14 through a transistor or solid-state switching element 16 to a load 18 connected to ground at 19 and comprising one or more lamps in the illustrated embodiment. A conductor 20 leads from the junction 22 of switching element 16 and load 18 to a Zener regulated series pass transistor voltage regulator indicated generally at 24. Regulator 24 comprises a series pass transistor 26 having its collector connected to the conductor 20, a Zener diode 28 having its anode connected to the base of transistor 26, and a resistor 30 connected at 31 between the collector of transistor 26 and the anode of Zener diode 28 to provide a bias between the collector and base of transistor 26 and a voltage source for diode 28. The other, or cathode, side of diode 28 is connected by a lead 32 to the source 10.

The emitter of transistor 26 is connected through resistance 34 to one side of capacitor 36, the other side of the capacitor being connected to lead 32. A coil 38 of reed switch 40 is connected in parallel with capacitor 36 through series resistor 42, the coil 38 being connected by lead 44 to midpoint 46 bewteen resistor 34 and capacitor 36, and the resistor 42 being connected to the source 10. The reed switch 40 has one contact 48 connected to ground and its other contact 50 connected through a resistor 52 to the base of switching transistor 16. In the event of a relatively high ambient temperature, above 120° F., for example, a protective resistor 54 may be connected across the base and emitter of switching transistor 16 as indicated by dashed lines in FIGS. 1 and 2.

The operation of the foregoing circuit is best described by reference to the arrows indicating current flow in FIGS. 1 and 2 of the drawings, FIG. 1 showing the flow of current in the "load-off" condition, and FIG. 2 showing the flow during the "load-on" condition. Referring to FIG. 1 ("load-off"), reed switch 40 is open, power switching transistor 16 is non-conducting and the lamp load 18 is "off." A current $I_1$ flows, however, from ground 19 through the lamps 18 and conductor 20 to junction 31 of regulator 24 where it divides or splits into currents $I_2$ and $I_3$. Current $I_2$ flows through resistor 30, Zener diode 28, and lead 32 to the positive terminal 10. The diode 28 is designed to "break down" under the applied voltage (9 to 20 volts, for example), and the current $I_2$ develops a fixed voltage drop across the diode (8.2 volts, for example) which establishes a constant base potential on the series pass regulator transistor 26 and holds the voltage on the emitter of the transistor constant over wide ranges of supply voltage due to the amplification in the transistor.

The current $I_3$ flows through the collector-emitter circuit of transistor 26 and resistor 34 to junction 46 where it divides into current $I_4$ and $I_5$. Current $I_4$ charges capacitor 36 while $I_5$ flows through coil 38 of reed switch 40 to the positive terminal 10. As the voltage developed across capacitor 36 becomes larger, the current $I_5$ becomes larger until it is sufficient to energize the reed switch 40 and cause contacts 48 and 50 to close, to render switching transistor 16 conductive and turning "on" the lamp load.

Referring now to FIG. 2 ("load-on"), a current $I_6$ is now flowing from ground (indicated at 56) through the closed contacts 48, 50 of reed switch 40, resistor 52, and switching transistor 16 so as to turn "on" (render conductive) the power switching transistor 16. Resistor 52 is selected to provide the proper saturation current in transistor 16 for the maximum lamp load desired. With the switching element 16 conductive, the lamp load 18 is connected directly between ground 19 and positive terminal 10 and is turned "on" by current $I_7$. At the same time, the voltage regulator 24 is substantially shorted and ceases to regulate. Capacitor 36 then begins to discharge and a current $I_8$ flows through reed switch coil 38 and resistor 42 to keep contacts 48 and 50 of reed switch 40 closed for a time determined by the sensitivity of the reed switch and the RC time constant of capacitor 36 and the resistance of resistor 42 the coil 38. When the reed switch contacts again open, the action again reverts to FIG. 1 and the process is repeated.

There is thus provided a very simple and low-cost flasher circuit for lamps or the like in which the rate of flash is not dependent upon the supply voltage (within limits established by the design of the series regulator), the timing circuit does not operate until the lamp load is connected and the circuit is almost completely noiseless in operaiton. Also, it will be seen in FIG. 1 that the charging current $I_1$–$I_2$–$I_3$ for capacitor 36 flows through the lamps which have almost zero resistance in the "load-off" condition, through the transistor regulator 24 which has a very low resistance, and through the resistor 34 which has a resistance much higher than the other two so that the former can be ignored. The rate of flash is thus almost completely independent of the load. The reed switch 40 can have an expected life of at least several million cycles, which gives a life expectancy of several years and well within the range of the practical utility of flashers of this type.

Typical values of the circuit components for a 12-volt supply having a rate of flash of 90 flashes per minute with an "on" and "off" time of 50% can be as set forth hereafter. Switching element 16 is a 2N1558 PNP transistor; load 18 comprises one or more lamps having a 32 candle power rating; transistor 26 is a PNP 2N3638; and diode 28 is an 8.2 volt Zener diode. Resistor 30 has a value of 120 ohms, resistor 34 a value of 100 ohms, the coil a resistance of 150 ohms, and resistor 42 a value of 33 ohms. Capacitor 36 is 6-volt 2000 microfarads, and resistor 54, when required, has a value of 27 ohms. The circuit as shown and described is set up for negative ground system. A positive ground may be used, however, by merely substituting NPN units for the transistors 16 and 24 and reversing the Zener diode 28 and capacitor 36.

While one embodiment of the invention has been shown and described, it will be evident that changes and modifications may be made without departing from the spirit of the invention, except as limited by the appended claims.

What is claimed is:

1. In an electric flasher circuit, the combination of a solid-state switching means having an emitter-collector circuit serially connecting a load to a source of power, means including an electromagnetic coil operated reed switch for alternately rendering said solid-state switching means conductive and non-conductive through said emitter-collector circuit so as to respectively energize and de-energize said load, and timing circuit means for operating said reed switch.

2. The combination as set forth in claim 1 in which said timing circuit means includes a voltage regulating means.

3. The combination as set forth in claim 2 in which said voltage regulating means comprises a series pass transistor controlled by a Zener diode.

4. In an electric flasher circuit, the combination of a solid-state switching means adapted to connect a load to a source of power, means including an electromagnetic coil operated reed switch for rendering said solid-state switch means conductive and non-conductive, and timing circuit means for operating said reed switch, said timing circuit means including voltage regulating means comprising a series pass transistor controlled by a Zener diode, said timing circuit means including said regulating means being connected to said power source in parallel with said solid-state switching means.

5. The combination as set forth in claim 4 in which one side of the series pass transistor of said regulating means is connected to the load side of said solid-state switching means.

6. The combination as set forth in claim 5 in which the other side of said series pass transistor is connected through a resistance means to a capacitor.

7. The combination a set forth in claim 6 in which said coil of said electromagnetically operated reed switch and a series connected resistance means are connected across said capacitor.

8. In an electric flasher circuit, the combination of a solid-state switching means adapted to connect a load to a source of power, means including an electromagnetic coil operated reed switch for rendering said solid-state switching means conductive and non-conductive, and timing circuit means for operating said reed switch, said timing circuit means comprising a capacitor, a series pass transistor voltage regulating means connected to said capacitor, and means connecting the coil of said electromagnetically operated reed switch across said capacitor in series with a resistance means.

9. The combination as set forth in claim 8 in which said timing circuit means is connected to said power source in parallel with said solid-state switching means.

10. In an electric flasher circuit, the combination of a solid-state switching means adapted to connect a load to a source of power, means including an electromagnetic coil operated reed switch for rendering said solid-state switching means conductive and non-conductive, and timing circuit means for operating said reed switch, said timing circuit means being connected to said power source in parallel with said solid-state switching means.

11. In an electrical flasher circuit, the combination of a solid-state switching means having an emitter-collector circuit serially connecting a load to a source of power, electromagnetic switching means serially in the base circuit of said solid-state switching means for alternately rendering said solid-state switching means conductive and non-conductive through said emitter-collector circuit so as to respectively energize and deenergize said load, and timing circuit means for operating said electromagnetic switching means.

12. In an electrical flasher circuit, the combination of a solid-state switching means adapted to connect a load to a source of electrical potential, electromagnetic switching means in the base circuit of said solid-state switching means effective when closed to render said solid-state switching mean conductive and effective when opened to render said solid-state switching means non-conductive and timing circuit means for operating said electromagnetic switching means, said timing circuit means comprising magnetic field generating means for at times generating a magnetic field to close said electromagnetic switching means, and capacitor means in parallel to said field generating means, said magnetic field generating means having current supplied therethrough by said source of electrical potential whenever said electromagnetic switching means is opened, and said magnetic field genertaing means having current supplied therethrough by said capacitor means whenever said electromagnetic switching means is closed, said capacitor means when discharging through said magnetic field generating means being effective to hol dsaid electromagnetic switching means closed for a predetermined length of time.

References Cited

UNITED STATES PATENTS

| | | | |
|---|---|---|---|
| 2,980,826 | 4/1961 | Harton | 317—148.5 |
| 3,084,311 | 4/1963 | Culbertson | 317—148.5 |
| 3,105,924 | 10/1963 | Peterson | 317—148.5 |
| 3,113,242 | 12/1963 | Leeder | 331—111 |
| 3,118,091 | 1/1964 | Sautels | 317—148.5 |
| 3,268,765 | 8/1966 | Randolph | 317—148.5 |

JOHN S. HEYMAN, Primary Examiner

B. P. DAVIS, Assistant Examiner